(12) United States Patent
Santoro et al.

(10) Patent No.: US 12,514,593 B2
(45) Date of Patent: Jan. 6, 2026

(54) SURGICAL REAMER DEVICE AND METHOD OF USING SAME

(71) Applicant: JTS Management, Inc., Redlands, CA (US)

(72) Inventors: John P. Santoro, Temecula, CA (US); James R. Vert, Redlands, CA (US)

(73) Assignee: JTS Management, Inc., Redlands, CA (US)

( * ) Notice: Subject to any disclaimer, the term of this patent is extended or adjusted under 35 U.S.C. 154(b) by 373 days.

(21) Appl. No.: 18/045,378

(22) Filed: Oct. 10, 2022

(65) Prior Publication Data

US 2023/0190307 A1 Jun. 22, 2023

Related U.S. Application Data

(60) Provisional application No. 63/262,371, filed on Oct. 11, 2021.

(51) Int. Cl.
*A61B 17/16* (2006.01)
*A61B 17/17* (2006.01)
(Continued)

(52) U.S. Cl.
CPC ...... *A61B 17/1615* (2013.01); *A61B 17/1635* (2013.01); *A61B 17/1637* (2013.01);
(Continued)

(58) Field of Classification Search
CPC ............ A61B 17/1659; A61B 17/1615; A61B 17/1635; A61B 17/1637; A61B 17/1657;
(Continued)

(56) References Cited

U.S. PATENT DOCUMENTS

| 4,472,094 A | | 9/1984 | Anderson |
| 5,180,384 A | * | 1/1993 | Mikhail ............. A61B 17/1659 606/80 |

(Continued)

FOREIGN PATENT DOCUMENTS

| EP | 3510948 A1 | 7/2019 |
| WO | WO 92/13503 A1 | 8/1992 |

OTHER PUBLICATIONS

PCT Search Report and Written Opinion for Application No. PCT US/2022/077863, dated Dec. 21, 2022, 34 pages.
Shoulders & Knees: Dr. Steven Struhl "Too Young for Knee Replacement Surgery a Knee Allograft Could Help", Blog Post, <https://www.shouldersandknees.com/blog/too-young-knee-replacement-surgery-allograft-could-help/> Nov. 7, 2016.
(Continued)

*Primary Examiner* — Marcela I. Shirsat
(74) *Attorney, Agent, or Firm* — Knobbe, Martens, Olson & Bear, LLP

(57) ABSTRACT

Embodiments of a reamer device for removing tissue from a patient, including a shaft, a cutting head having at least four cutting blades, and a depth-limiting flange extending radially outwardly away from the at least four cutting blades. Some embodiments of the reamer device can have a shaft, a cutting head coupled with the shaft, and a depth limiting element. The cutting head can have at least four cutting blades. In some embodiments, the depth limiting element can have a distal surface configured to contact a surface of the patient's tissue to limit a depth into the patient's tissue that the at least four cutting blades can advance to, and/or can be configured to extend radially outwardly of the at least four cutting blades so that the depth limiting element contacts a surface of the patient's tissue adjacent to a cutout created by the at least four cutting blades.

20 Claims, 14 Drawing Sheets

(51) Int. Cl.
*A61B 17/56* (2006.01)
*A61F 2/46* (2006.01)

(52) U.S. Cl.
CPC ......... *A61B 17/164* (2013.01); *A61B 17/1659* (2013.01); *A61B 17/1662* (2013.01); *A61B 17/1664* (2013.01); *A61B 17/1666* (2013.01); *A61B 17/1668* (2013.01); *A61B 17/1675* (2013.01); *A61B 17/1684* (2013.01); *A61B 17/1796* (2013.01); *A61B 2017/564* (2013.01); *A61F 2/4618* (2013.01); *A61F 2/4644* (2013.01); *A61F 2002/4645* (2013.01); *A61F 2002/4648* (2013.01); *A61F 2002/4649* (2013.01)

(58) Field of Classification Search
CPC .............. A61B 17/1662; A61B 17/164; A61B 17/1664; A61B 17/1666; A61B 17/1668; A61B 17/1675; A61B 17/1684; A61B 17/1796; A61B 2017/564; A61B 2090/036; A61F 2002/4645; A61F 2002/4648; A61F 2002/4649; A61F 2/30756; A61F 2/4601; A61F 2/4602; A61F 2/4614; A61F 2/4618; A61F 2/4644
USPC .......................................................... 606/80
See application file for complete search history.

(56) References Cited

U.S. PATENT DOCUMENTS

| | | | |
|---|---|---|---|
| 5,312,411 A * | 5/1994 | Steele | A61B 17/1764 606/88 |
| 6,221,076 B1 * | 4/2001 | Albrektsson | A61B 17/1666 407/62 |
| 7,264,634 B2 | 9/2007 | Schmeiding | |
| 7,896,883 B2 | 3/2011 | Ek et al. | |
| 7,959,636 B2 | 6/2011 | Schmeiding | |
| 8,043,315 B2 | 10/2011 | Shepard | |
| 8,388,624 B2 | 3/2013 | Ek et al. | |
| 8,523,867 B2 | 9/2013 | Rauscher et al. | |
| 8,641,718 B2 | 2/2014 | Meridew | |
| 8,764,753 B2 | 7/2014 | Oren et al. | |
| 8,998,918 B2 | 4/2015 | Jamali | |
| 9,055,955 B2 | 6/2015 | Ek et al. | |
| 9,468,448 B2 | 10/2016 | Sikora et al. | |
| 2014/0350561 A1 | 11/2014 | Dacosta et al. | |
| 2017/0095324 A1 * | 4/2017 | Adams | A61F 2/08 |
| 2021/0251643 A1 | 8/2021 | Stump | |

OTHER PUBLICATIONS

Sechriest, et al. "Osteochondral allograft transplantation." AANA Advanced Arthroscopic Surgical Techniques (2016): 243-255.
Cluett, Jonathan, MD "Cheilectomy Surgery for Big Toe Arthritis", Very Well Health, Feb. 6, 2018, 10 pages.

* cited by examiner

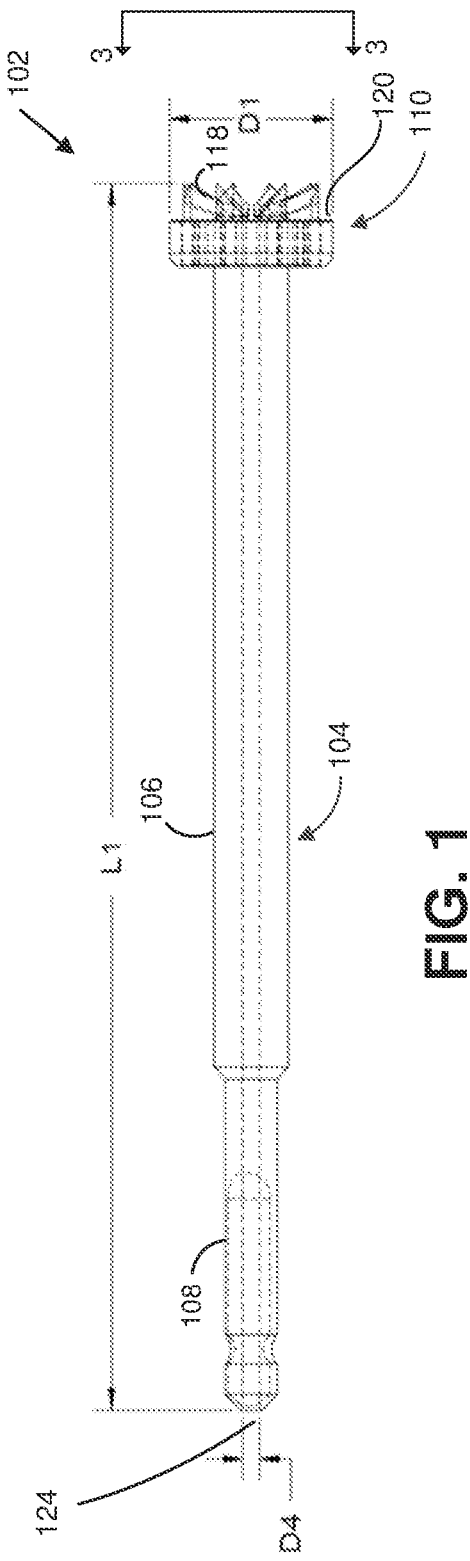
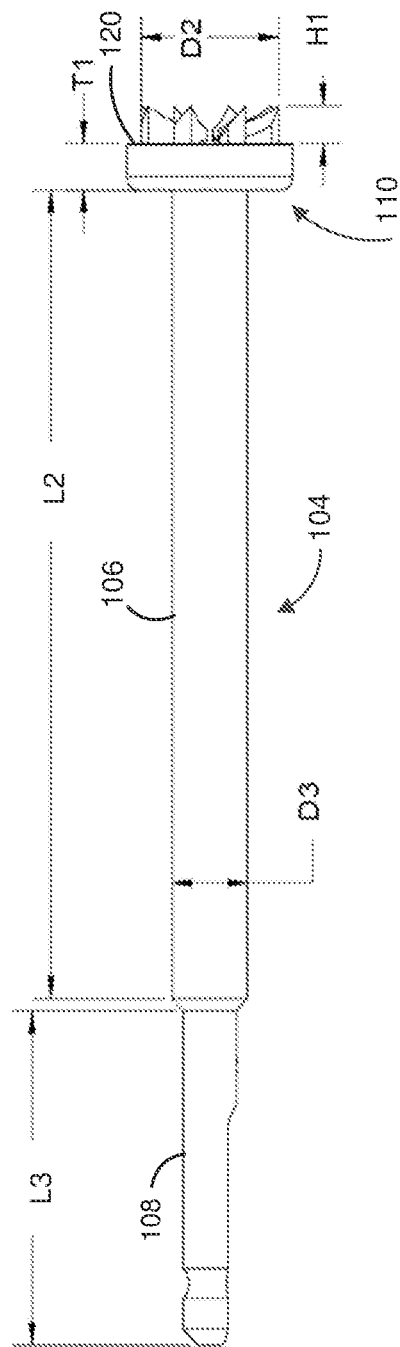
FIG. 1
FIG. 2

| Dimension Symbol | Optional Dimension (mm) | Optional Dimension (mm) | Optional Dimension Value (mm) | Range of Optional Dimensions (mm) |
|---|---|---|---|---|
| D1 | 13.8 (or approximately 13.8) | 10 (or approximately 10) | 18 (or approximately 18) | 5-25 (or approximately 5 to approximately 25), 10 to 8 (or approximately 10 to approximately 18) |
| D2 | 12 (or approximately 12) | 10 (or approximately 10) | 15 (or approximately 15) | 3 to 23 (or approximately 3 to approximately 23), or 10 to 15 (or approximately 10 to approximately 15) |
| D3 | 1.5 (or approximately 1.5) | 1.2 (or approximately 1.2) | 1.8 (or approximately 1.8) | 1.2 to 1.8 (or approximately 1.2 to approximately 1.8) |
| L1 | 92.8 (or approximately 92.8) | 90 (or approximately 90) | 95 (or approximately 95) | 90 to 95 (or approximately 90 to approximately 95) |
| L2 | 60.6 (or approximately 60.6) | 58 (or approximately 58) | 63 (or approximately 63) | 58 to 63 (or approximately 58 to approximately 63) |
| L3 | 25 (or approximately 25) | 23 (or approximately 23) | 27 (or approximately 27) | 23 to 27 (or approximately 23 to approximately 27) |
| L4 | 5.2 (or approximately 5.2) | 4.8 (or approximately 4.8) | 5.5 (or approximately 5.5) | 4.8 to 5.5 (or approximately 4.8 to approximately 5.5) |
| L5 | 3.4 (or approximately 3.4) | 3.0 (or approximately 3.0) | 4.0 (or approximately 4.0) | 3.0 to 4.0 (or approximately 3.0 to approximately 4.0) |
| L6 | 2 (or approximately 2) | 1.8 (or approximately 1.8) | 2.2 (or approximately 2.2) | 1.8 to 2.2 (or approximately 1.8 to approximately 2.2) |
| W1 | 1.7 (or approximately 1.7) | 1.5 (or approximately 1.5) | 1.9 (or approximately 1.9) | 1.5 to 1.9 (or approximately 1.5 to approximately 1.9) |
| W2 | 1.7 (or approximately 1.7) | 1.5 (or approximately 1.5) | 1.9 (or approximately 1.9) | 1.5 to 1.9 (or approximately 1.5 to approximately 1.9) |
| W3 | 2.4 (or approximately 2.4) | 2 (or approximately 2) | 3 (or approximately 3) | 2 to 3 (or approximately 2 to approximately 3) |
| T1 | 3.5 (or approximately 3.5) | 3 (or approximately 3) | 4 (or approximately 4) | 3 to 4 (or approximately 3 to approximately 4) |

FIG. 11 (Table 1)

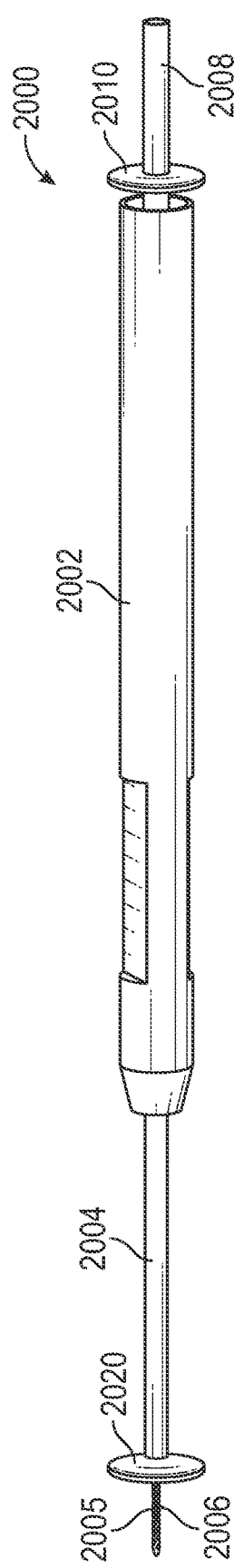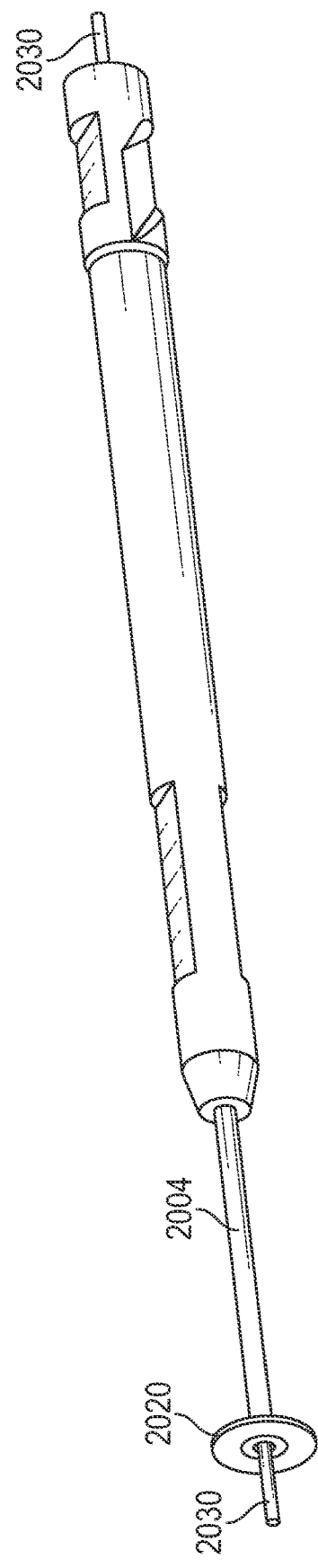

SURGICAL REAMER DEVICE AND METHOD OF USING SAME

INCORPORATION BY REFERENCE TO ANY PRIORITY APPLICATIONS

This application claims the priority benefit under 35 U.S.C. § 119(e) to U.S. Provisional Patent Application Ser. No. 63/262,371, filed Oct. 11, 2021, titled "SURGICAL REAMER DEVICE AND METHOD OF USING SAME", the entirety of which is hereby expressly incorporated by reference as if fully set forth herein. Any and all applications for which a foreign or domestic priority claim is identified in the Application Data Sheet as filed with the present application are hereby incorporated by reference under 37 CFR 1.57.

BACKGROUND OF THE DISCLOSURE

Field of the Disclosure

Some devices and methods disclosed herein relate to removal of defective material from joints and other anatomy.

SUMMARY OF SOME EXEMPLIFYING EMBODIMENTS

The systems, methods and devices described herein have innovative aspects, no single one of which is indispensable or solely responsible for their desirable attributes. Without limiting the scope of the claims, some of the advantageous features will now be summarized.

To provide a solution to the drawbacks and limitations of conventional surgical reamers, disclosed herein are reamer device embodiments for removing tissue from a patient, including a shaft, a cutting head having at least four cutting blades, and a depth-limiting flange extending radially outwardly away from the at least four cutting blades. Some embodiments of the reamer device disclosed herein can have a shaft, a cutting head coupled with the shaft, and a depth limiting element. In some embodiments, the cutting head can have at least four cutting blades. In some embodiments, the depth limiting element can have a distal surface configured to contact a surface of the patient's tissue to limit a depth into the patient's tissue that the at least four cutting blades can advance to, and/or can extend radially outwardly of the at least four cutting blades so that the depth limiting element contacts a surface of the patient's tissue adjacent to a cutout created by the at least four cutting blades.

Also disclosed herein are embodiments of a reamer device for removing tissue from a patient, wherein the reamer device can have a shaft, a cutting head having a plurality of cutting blades, and a depth limiting element circumscribing the plurality of cutting blades. In some embodiments, the depth limiting element can define a generally planar surface. In some embodiments, an outer diameter of the plurality of cutting blades can be at least 10% less than an outer diameter of the depth limiting element. The depth limiting element can be configured to limit a depth that the plurality of cutting blades can penetrate the defective tissue. The plurality of cutting blades can extend axially away from the planar surface.

Any embodiments of the reamer device disclosed herein can have one or more of the following components, features, or details, in any combination: wherein the depth limiting element comprises a surface that is generally planar and generally perpendicular to a longitudinally extending axial centerline axis of the reamer device; wherein the depth limiting flange is configured to limit the depth that the one or more cutting blades can penetrate the defective tissue; wherein the depth-limiting flange includes a surface that is generally planar and generally perpendicular to an axial centerline of the reamer device; including a bore extending through the shaft and the cutting head along a longitudinally extending axial centerline axis of the shaft and cutting head; wherein the defective tissue includes at least one of cartilage, bone, or connective tissue; wherein the cutting head can have a first type of cutting blade and a second type of cutting blade, wherein the first type of cutting blade is different (for example, without limitation, longer) than the second type of cutting blade; wherein the cutting head can have four of a first type of cutting blade and four of a second type of cutting blade, wherein the first type of cutting blade is different than the second type of cutting blade; wherein the at least four cutting blades includes a first type of cutting blade and a second type of cutting blade, wherein the first type of cutting blade has a first length, a first height, and a first width, the second type of cutting blade has a second length, a second height, and a second width, and the first length is different than the second length, the first height is different than the second height, and/or the first width is different than the second width; including four of the first type of cutting blade and four of the second type of cutting blade, wherein each of the four of the second type of cutting blade are positioned between each of the four of the first type of cutting blade; including four of the first type of cutting blade and four of the second type of cutting blade, wherein each of the four second type of cutting blade are positioned between each of the four first type of cutting blade, and the first length of the first type of cutting blade is longer than the second length of the second type of cutting blade; including a plurality of openings extending through the cutting head in an axial direction, the plurality of openings being configured to facilitate a passing of cut tissue through said openings during use of the reamer; including a plurality of openings extending through the cutting head in an axial direction, the plurality of openings being configured to permit a passage of removed tissue to pass through said openings during use of the reamer and being positioned between each of the cutting blades; wherein the cutting head has eight cutting blades; wherein the cutting head has eight cutting blades and eight openings extending through the cutting head in an axial direction, the openings being configured to permit removed tissue to pass through said openings during use of the reamer; wherein each of the eight openings is positioned between each of the eight cutting blades; wherein the cutting blades each has an angled profile such that a height of the cutting blades increases along a length of the cutting blades such that the outermost portion of the cutting blades have a larger height than portions of the cutting blades that are radially inward from the outermost portion of the cutting blades; wherein each of the at least four cutting blades can have a curved cutting surface configured to create a curved surface at a bottom of the cutout; wherein the shaft is flexible at least along a length thereof; and/or wherein the depth limiting element comprises an annular flange positioned radially outward of the at least four cutting blades.

Also disclosed herein are embodiments of a system for removing tissue from a patient, including the reamer device of any one of the embodiments disclosed herein and a guide element, wherein the reamer is configured to be advanced over the guide element. Also disclosed herein are embodiments of a system for removing tissue from a patient, further including one or more punches configured to size an allograft to approximately match a size of a recess formed in a patient by the blades of the cutting head. In some embodiments, the system can include an allograft, an anchor element, and a delivery device.

Also disclosed herein are embodiments of a reamer device for removing tissue from a patient, including a shaft, a cutting head having a plurality of cutting blades, and a depth limiting flange circumscribing the plurality of cutting blades, the depth limiting flange defining a generally planar surface. Any embodiments of the reamer device for removing tissue from a patient disclosed herein can have one or more of the following components, features, or details, in any combination: wherein an outer diameter of the plurality of cutting blades is at least 10% less than an outer diameter of the depth limiting flange; wherein the depth limiting flange is configured to limit the depth that the plurality of cutting blades can penetrate the defective tissue; wherein the plurality of cutting blades extend axially away from the planar surface, and further including a plurality of openings extending through the cutting head in an axial direction, the plurality of openings being configured to permit cut tissue to pass through said openings during use of the reamer.

Also disclosed herein are embodiments of a method of treating a tissue of a patient that can in some embodiments, include advancing a reamer device toward a surface of a patient's tissue, and creating a cutout to a predetermined depth with one or more cutting blades of the reamer device to excise tissue from the patient. In some embodiments, creating a cutout to a predetermined depth with the reamer device can include advancing the reamer device into the patient's tissue until a depth limiting element of the reamer device prevents the one or more blades of the reamer device from advancing to a greater depth into the patient's tissue.

Any embodiments of the method of treating a tissue of a patient disclosed herein can include one or more of the following components, features, or details, in any combination: wherein the reamer device further can include a shaft and a cutting head coupled with the shaft; wherein the cutting head has at least four cutting blades; wherein the depth limiting element can extend radially outwardly of the at least four cutting blades so that the depth limiting element contacts a surface of the patient's tissue adjacent to the cutout created by the at least four cutting blades; wherein the depth limiting element can include a surface that can be generally planar and generally perpendicular to a longitudinally extending axial centerline axis of the reamer device, further comprising a bore extending through the shaft and the cutting head along a longitudinally extending axial centerline axis of the reamer device; wherein the tissue excised from the patient can include cartilage, bone, and/or connective tissue; wherein the cutting head can include a first type of cutting blade and a second type of cutting blade; wherein the first type of cutting blade can be different than the second type of cutting blade; wherein the cutting head can include four of a first type of cutting blade and four of a second type of cutting blade; wherein the first type of cutting blade can be longer than the second type of cutting blade; wherein the one or more cutting blades of the reamer device can include a first type of cutting blade and a second type of cutting blade; wherein the first type of cutting blade has a first length, a first height, and a first width, the second type of cutting blade has a second length, a second height, and a second width, and the first length can be different than the second length, the first height can be different than the second height, and/or the first width can be different than the second width; wherein the method can include four of the first type of cutting blade and four of the second type of cutting blade; wherein each of the four of the second type of cutting blade are positioned between each of the four of the first type of cutting blade; wherein: each of the four second type of cutting blade are positioned between each of the four first type of cutting blade, and the first length of the first type of cutting blade can be longer than the second length of the second type of cutting blade; wherein the reamer device can include a plurality of openings extending through a cutting head of the reamer device in an axial direction, the plurality of openings being configured to facilitate a passing of cut tissue through said openings during use of the reamer device head has eight cutting blades and eight openings extending through the cutting head in an axial direction, the openings being configured to permit removed tissue to pass through said openings during use of the reamer; wherein each of the eight openings can be positioned between each of the eight cutting blades; wherein the reamer device has a plurality of cutting blades each of which has an angled profile such that a height of the cutting blades increases along a length of the cutting blades such that the outermost portion of the cutting blades have a larger height than portions of the cutting blades that are radially inward from the outermost portion of the cutting blades; wherein the reamer device has a plurality of cutting blades each of which has a curved cutting surface configured to create a curved surface at a bottom of the cutout; wherein the shaft can be flexible at least along a length thereof; wherein the depth limiting element can include an annular flange positioned radially outward of the at least four cutting blades; wherein the method can include advancing the reamer device over a guide element; wherein the method can include securing an allograft in the cutout with an anchor element; wherein the method can include drilling a bore hole into the patient's tissue at an axial center or approximate axial center of the cutout; wherein the method can include drilling a bore hole into the patient's tissue at an axial center or approximate axial center of the cutout and through an axial center of a tissue graft; and/or comprising securing a graft in the cutout by advancing an anchor element through a bore hole created in the patient's tissue and through the graft.

Also disclosed herein are embodiments of an articular cartilage restoration system including any of the reamer device embodiments disclosed herein, or any of the reamer device embodiments disclosed herein and a guide element. Also disclosed herein are methods of removing defect material from a joint of a patient, using any of the reamer device embodiments disclosed herein.

BRIEF DESCRIPTION OF THE DRAWINGS

FIG. 1 is a first side view of an embodiment of a reamer, with dashed lines showing some of the hidden features.

FIG. 2 is a second side view of the embodiment of the reamer shown in FIG. 1.

FIG. 11 illustrates a table of dimensional values (Table 1) for some embodiments of the reamer device disclosed herein.

FIG. 18 is a side view of an embodiment of an instrument for implanting a graft in a cutout created by any reamer embodiments disclosed herein, showing a drill element extending from a distal end of a cannula.

FIG. 19 is a perspective view of the embodiment of the instrument shown in FIG. 18.

DETAILED DESCRIPTION

Figure 3:
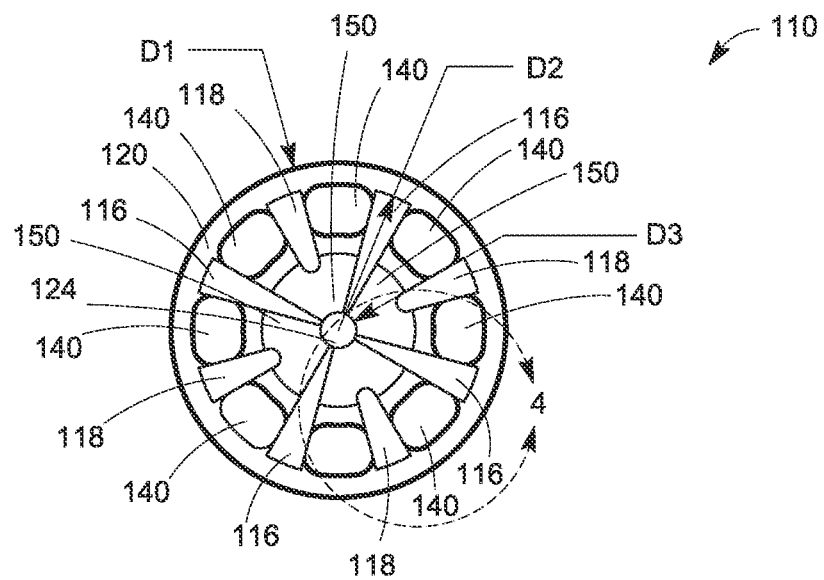
FIG. 3 is an enlarged end view of the embodiment of the reamer shown in FIG. 1, as defined in FIG. 1.

In the following detailed description, reference is made to the accompanying drawings, which form a part hereof. In the drawings, similar symbols typically identify similar components, unless context dictates otherwise. The illustrative arrangements described in the detailed description, drawings, and claims are not meant to be limiting. Other arrangements may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are embodiments of systems 100 for restoring cartilage in a patient. In some embodiments disclosed herein, the system 100 can be configured to excise a defect in articular cartilage and bone and to create a recess or bore in the patient's tissue for implantation of a well suited living or synthetic tissue substitute. The embodiments of the systems 100 include one or more reamers 102 for removing defective tissue, bone, cartilage, or other matter in a patient. Some reamer and articular cartilage restoration system embodiments disclosed herein are configured to be quick and easy-to-use, and are designed to replace cartilaginous defects in ball and socket type joints using an open technique. However, any embodiments of the articular cartilage restoration system disclosed herein can be configured for use in arthroscopic techniques or other suitable or appropriate techniques also, with or without modifications to the embodiments of the surgical reamer devices disclosed herein.

Reamer

Figure 4:
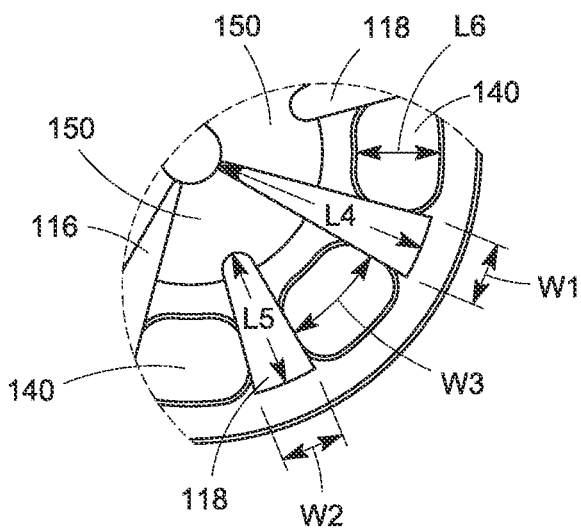
FIG. 4 is an enlarged view of a portion of the end view of the reamer shown in FIG. 3.
Figure 5:
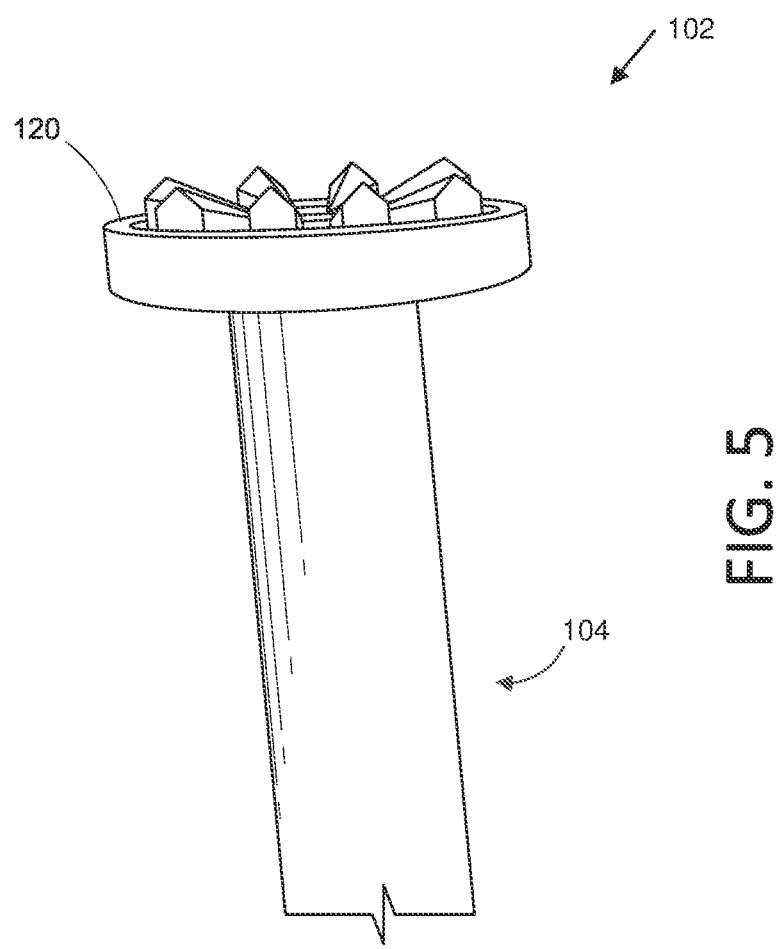
FIG. 5 shows an embodiment of a reamer.
Figure 6:
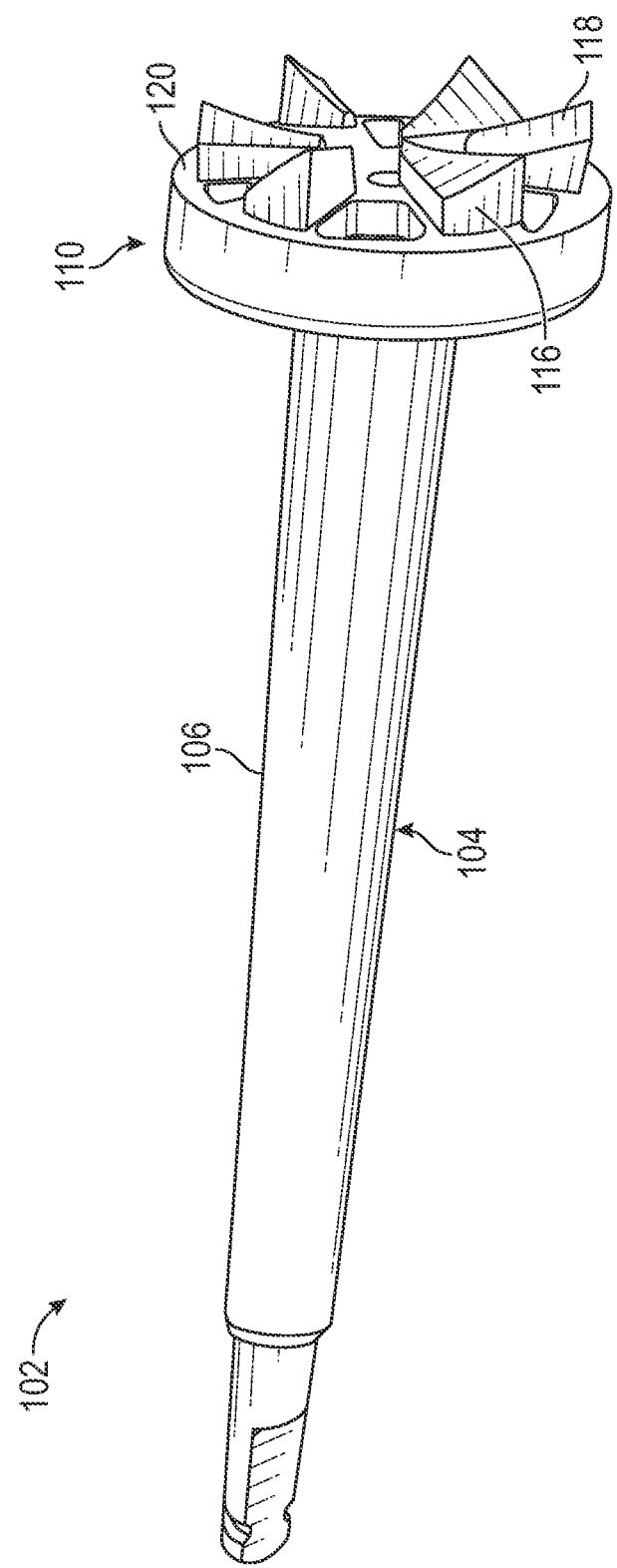
FIG. 6 shows an embodiment of a reamer.
Figure 7:
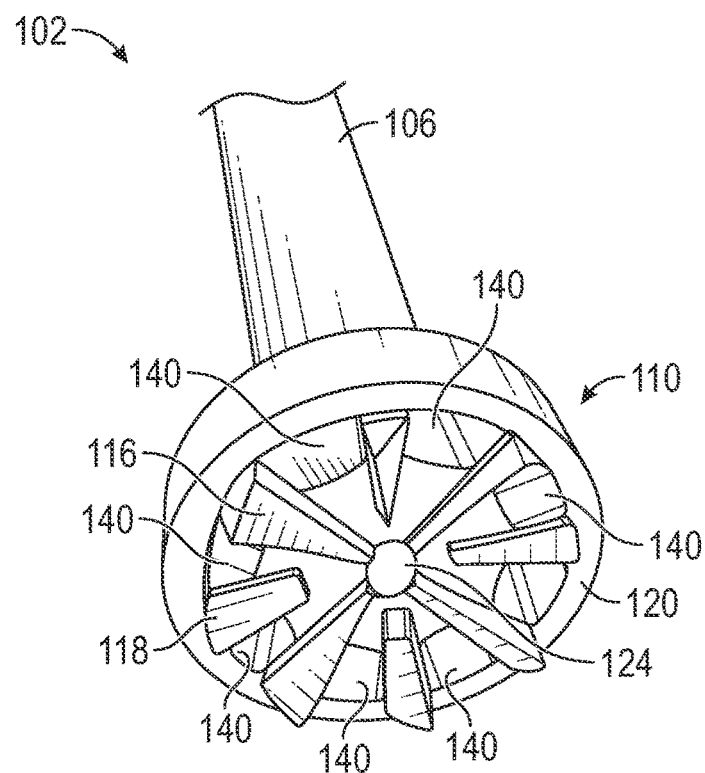
FIG. 7 shows an embodiment of a reamer.
Figure 8:
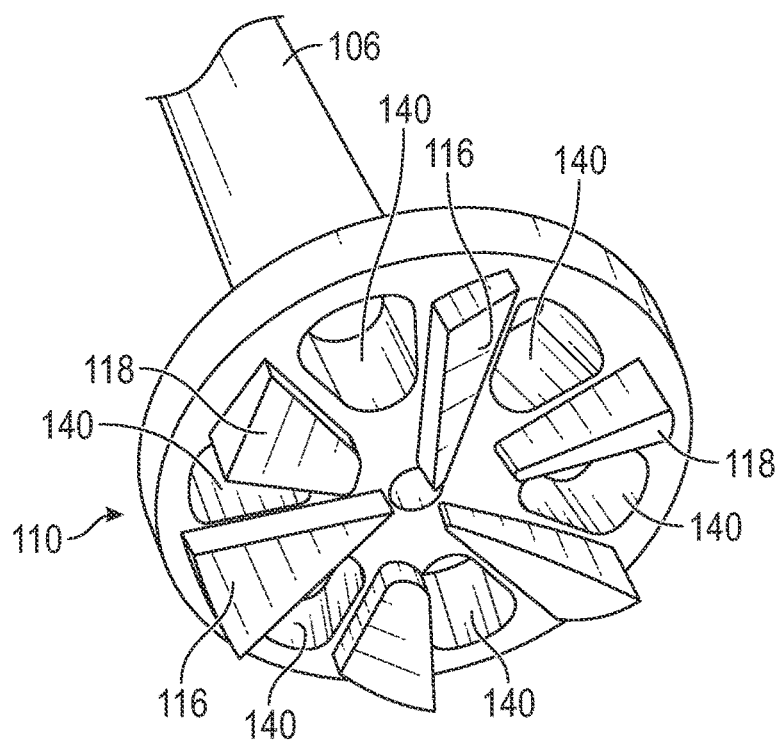
FIG. 8 shows an embodiment of a reamer.
Figure 9:
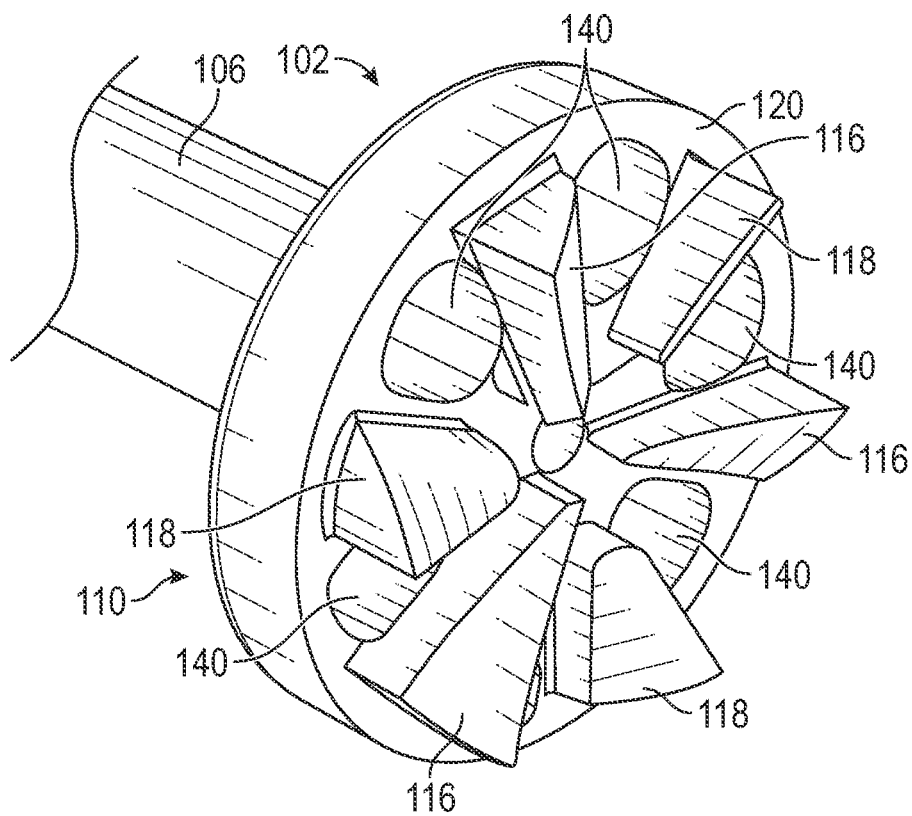
FIG. 9 shows an embodiment of a reamer.
Figure 10:
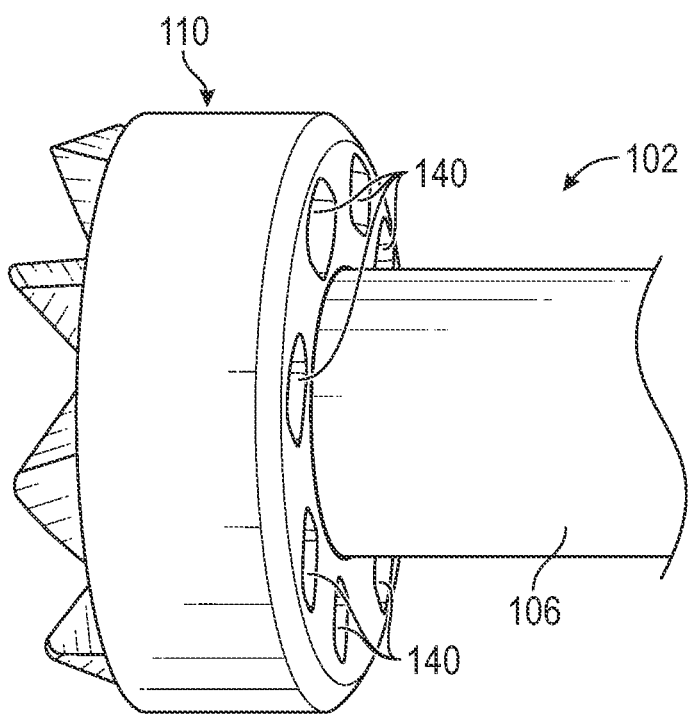
FIG. 10 shows an embodiment of a reamer.

The embodiments of the reamer (including without limitation reamer 102) disclosed herein can be configured to create a circular cutout on the surface of a joint (which can be a convex surface or a concave surface) in the patient's body that can accommodate a substitute material or tissue (e.g., a cartilage substitute) having the same or a similar diameter as compared to the cutout or bore. The cartilage substitute can be an articular cartilage material, and can be living or synthetic. A corresponding punch can be used to size the living articular cartilage that can be placed in the cutout created by the reamer. FIG. 1 is a first side view of an embodiment of a reamer 102, with dashed lines showing hidden features. FIG. 2 is a second side view of the embodiment of the reamer 102 shown in FIG. 1. FIG. 3 is an enlarged end view of the embodiment of the reamer 102 shown in FIG. 1. FIG. 4 is an enlarged view of a portion of the end view of the reamer 102 shown in FIG. 3.

With reference to FIGS. 1-10, any embodiments of the reamer disclosed herein, including reamer 102, can have shaft portion 104 having a body portion 106 and an attachment portion 108, and a cutting portion 110 (also referred to herein as a cutting head). In some embodiments, the shaft portion 104 can be rigid along a length thereof. In any embodiments disclosed herein, the shaft portion can be flexible along a length thereof so as to allow the shaft to bend, thereby improving access and positionability of the reamer. In some embodiments, where the shaft portion 104 is flexible, the reamer can be configured such that the shaft is torsionally rigid, or torsionally substantially rigid to transfer a torque load along a length of the shaft without substantial twisting or deformation of the shaft in a circumferential direction along a length thereof.

The attachment portion 108 can be configured for a standard American Orthopedic (AO) connection. Any embodiments of the reamer 102 or any other reamer embodiments disclosed herein can have an overall length (illustrated as L1 in FIG. 1) that can be 92.8 mm (3.7 in) or approximately 92.8 mm, or from 70 mm (2.8 in), approximately 70 mm, or less than 70 mm to 120 mm (4.7 in), approximately 120 mm, or more than 120 mm, or from 85 mm (3.3 in) or approximately 85 mm to 100 mm (4 in) or approximately 100 mm, or of any value or range of values within the foregoing ranges. Any embodiments of the reamer 102 or any other reamer embodiments disclosed herein can have a length of the body portion 106 (illustrated as L2 in FIG. 2) that can be 60.6 mm (2.4 in), or approximately 60.6 mm, or from 50 mm (2 in), approximately 50 mm, or less than 50 mm less to 70 mm (3 in), approximately 70 mm, or more than 70 mm, or from 55 mm (2.2 in) or approximately 55 mm to 65 mm (2.6 in) or approximately 65 mm, or of any value or range of values within the foregoing ranges. Any embodiments of the reamer 102 or any other reamer embodiments disclosed herein can have a length of the attachment portion 108 (illustrated as L3 in FIG. 2) that can be 25 mm (1 in) or approximately 25 mm, or from 15 mm (0.6 in), approximately 15 mm, or less than 15 mm to 35 mm (1.4 in), approximately 35 mm, or more than 35 mm, or from 20 mm (0.8 in) or approximately 20 mm to 30 mm (1.2 in) or approximately 30 mm, or of any value or range of values within the foregoing ranges. Additionally, without limitation, any embodiments of the reamers disclosed herein, including without limitation reamer 102, can have any of the values, ranges of values, or values within the ranges of values, approximately or precisely as listed in Table 1 of FIG. 11.

The cutting portion 110 of any embodiments disclosed herein can have an outer diameter D1 that can be 13.8 mm (0.5 in) or approximately 13.8 mm, or from 11 mm (0.4 in), approximately 11 mm, or less than 11 mm to 24 mm (0.9 in), approximately 24 mm, or more than 24 mm, or from 11 mm (0.4 in), approximately 11 mm, or less than 11 mm to 17 mm (0.7 in), approximately 17 mm, or more than 17 mm, or from 13 mm (0.5 in) or approximately 13 mm to 14.5 mm (0.6 in) or approximately 14.5 mm, or, in other embodiments, can have any of the values, ranges of values, or values within the ranges of values, approximately or precisely as listed in Table 1.

Any embodiments of the reamer 102 disclosed herein can be configured to limit a depth of the defect or depression that is cut into the patient's tissue or cartilage. For example, in some embodiments, the cutting portion 110 can have a plurality of cutting blades 116, 118 (also referred to herein as teeth) and a shoulder or depth-limiting flange 120 (also referred to herein as a depth limiting element) surrounding the cutting blades 116, 118. The depth-limiting element can be configured to contact a surface of the patient's tissue (which can include cartilage) or bone surrounding the area to be cut or bored with the reamer when the cutting blades of the reamer have reached the desired depth. When the depth-limiting element contacts the surface of the patient's tissue or bone (collectively referred to herein as the patient's tissue), the depth-limiting element will inhibit (e.g., prevent) the reamer and, hence, the cutting blades of the reamer, from advancing to a greater depth in the patient's tissue or bone, thereby providing a more accurate and controllable depth of the bore in the patient's tissue and/or bone.

In some embodiments, the reamer can be configured to allow a surgeon or other user to adjust a depth of the cutting blades and, hence, the depth of the cutout (also referred to herein as a bore), relative to the depth limiting element. Without limitation, in some embodiments, the reamer can have a telescoping depth adjusting element configured to be movable in an axial direction relative to the cutting blades to adjust a relative position of a distal end of the cutting blades relative to a distal end of the depth adjusting element. For example and without limitation, some embodiments of the reamer can be configured so that depth limiting feature is movable (e.g., incrementally movable) relative to the cutting blades of the reamer. The depth limiting feature can include a collar or other movable component having the flange surface on a distal end of the depth limiting feature and can include ball and detents, threads, teeth, one or more set screws, or other axial adjustment features that can allow the movable component to be moved to the desired position relative to a distal surface of the cutting blades and secured in the desired location. The movable component can have, but is not required to have, an annular shaped body. A distal end portion of the movable portion can be configured to abut against a surface of the patient's tissue and/or bone to inhibit (e.g., prevent) the cutting blades from penetrating any further into the patient's tissue and/or bone once the distal end portion or surface of the movable component is in contact with the patient's tissue and/or bone surrounding the bore. In some embodiments, the movable component can be threadably coupled with the cutting portion 110 of the reamer so that, if the movable component is rotated in a first direction, a distal end portion of the movable portion can be advanced in a first direction, such as toward the distal end of the cutting blades, thereby resulting in a bore hole that has a shallower depth and so that, if the movable component is rotated in a second direction that is opposite to the first direction, the distal end portion of the movable portion can be advanced in a second direction that is opposite to the first direction, such as away from the distal end of the cutting blades, thereby resulting in a bore hole that has a greater or deeper depth. In other embodiments, the user can adjust the position of the movable portion and secure it in the desired position using ball and detents, threads, teeth, or other suitable features.

Any embodiments of the reamers disclosed herein, including without limitation reamer 102, can have a plurality of openings 140 extending through the cutting portion 110 to facilitate a removal of tissue and debris from the joint. The openings 140 can be configured to permit tissue and debris to pass through said openings 140 during use of the reamer 102. In some embodiments, the openings 140 can be positioned between each of the cutting blades. In other embodiments, the openings 140 can be positioned adjacent to one or more of the cutting blades. In some embodiments, the openings 140 can extend from one cutting blade to an adjacent cutting blade. In some embodiments, the openings 140 can abut against a radially extending surface of the cutting blades to maximize a width of the openings 140.

Without limitation, the openings 140 can have a length (represented by L6 in FIG. 4) that can be 2.0 mm (0.08 in), or approximately 2.0 mm, or from 1.0 mm (0.04 in), approximately 1.0 mm, or less than 1.0 mm, to 3.0 mm (0.12 in), approximately 3.0 mm, or more than 3.0 mm, or from 1.5 mm (0.06 in) or approximately 1.5 mm to 2.5 mm (0.1 in) or approximately 2.5 mm, or of any value or from and to any values within these ranges. Without limitation, the openings 140 of any embodiments can have a width (represented by W3 in FIG. 4) that can be 2.5 mm (0.1 in) or approximately 2.5 mm, or from 1.5 mm (0.06 in), approximately 1.5 mm, or less than 1.5 mm to approximately 3.5 mm (0.14 in), 3.5 mm, or more than 3.5 mm, or from 2.0 mm (0.08 in) or approximately 2.0 mm to 3.0 mm (0.12 in) or approximately 3.0 mm, or of any value or from and to any values within these ranges. The openings 140 in any of the cutting head embodiments disclosed herein can be positioned adjacent to the cutting blades to be as large as the space between the cutting blades permits, at least in the width direction. In some embodiments, the width of the openings 140 can increase along a length of the openings 140, as shown in FIGS. 3-4.

In some embodiments, the shape of the openings can be selected to maximize the size of the openings. For example, the openings can be shaped to match a shape of the space between the cutting blades, so that the side of the openings are approximately coincident with the sides of the cutting blades. In other embodiments, the opening can be any desired shape or size, including circular, ovular, square, rectangular, or otherwise.

In some embodiments, the blades of the cutting portion 110 of any reamers disclosed herein can be the same. In other embodiments, the cutting portion 110 can have a first type of cutting blade 116 and a second type of cutting blade 118 wherein the first type of cutting blade is different than the second type of cutting blade. The first and second types of blades can alternate in position. Alternatively, some embodiments of the cutting portion 110 can have more than two different types of cutting blades, such as three or four different types of cutting blades, or all of the same type of cutting blades. The different types of cutting blades can be different in terms of shape, dimensions, or otherwise, as is further described below with respect to the first and second types of cutting blades of the example embodiment of the reamer illustrated in at least FIGS. 1-5.

The first type of cutting blade 116 can be different than the second type of cutting blade in length (i.e., in a radial direction from an axial center of the reamer, such as length L4 of the first type of cutting blade 116 illustrated in FIG. 4 or length L5 of the second type of cutting blade 118 illustrated in FIG. 4), height (i.e., in an axial direction of the reamer, such as H1 for the first and second types of cutting blades 116, 118 illustrated in FIG. 2), and/or width (i.e., a thickness of the cutting blade, such as width W1 of the first type of cutting blade 116 illustrated in FIG. 4 or width W2 of the second type of cutting blade 118 illustrated in FIG. 4). In some embodiments, the width W1 and/or width W2 may change (e.g., increase) along a length of the cutting blades.

In any embodiments, without limitation, the cutting portion 110 can have four of the first type of cutting blade 116 and four of the second type of cutting blade 118. In any embodiments, the cutting portion 110 can have four of the first type of cutting blade 116, four of the second type of cutting blade 118, and eight openings 140 positioned between the cutting blades. The first type of cutting blade 116 can have a length (represented by L4, as shown in FIG. 4) that is greater than a length (represented by L5, as shown in FIG. 4) of the second type of cutting blade 118. With the second type of cutting blades 118 having a shorter length than the first type of cutting blade, channels 150 can be formed around some of the cutting blade (for example, the second type of cutting blade) that can provide a space or channel 150 through which tissue and other matter cut away from the joint during use of the reamer can pass to facilitate removal of tissue and debris from the joint during the reaming process. The channels 150 can be configured to provide a channel or pathway to the openings 140 formed in the cutting head 110. In this configuration, tissue and debris cut away from the joint can pass through the channels 150 toward the openings 140, through the openings 140 through the cutting head 110 to be removed from the joint. This can prevent or reduce the likelihood of clogging of the reamer and potentially reduce the risk of additional trauma or damage to the healthy tissue adjacent to the tissue to be removed, and also make the surgical reaming process more efficient.

In some embodiments, the first type of cutting blade 116 can have a length of 5.2 mm (0.2 in) or approximately 5.2 mm (or any value or range of values, as described elsewhere herein) and the second type of cutting blade 118 can have a length of 3.4 mm (0.13 in) or approximately 3.4 mm (or any value or range of values, as described elsewhere herein). Alternatively, any reamer embodiments disclosed herein can have cutting blade having any of the values, ranges of values, or values within the ranges of values, approximately or precisely as listed in Table 1 of FIG. 11. Optionally, the cutting blade can be configured such that the second type of cutting blade 118 are 35% or approximately 35% shorter in length than the first type of cutting blade 116, or from 20% or approximately 20% shorter to 50% or approximately 50% shorter (i.e., half the length), or from 30% or approximately 30% shorter to 40% or approximately 40% shorter as compared to the second type of cutting blade 116, or shorter by any value or ranges of values within the foregoing ranges.

In some embodiments, the width W1, W2 of the cutting blade 116, 118 can vary along the length of the cutting blade 116, 118. For example and without limitation, a width W1 of the first type of cutting blade can vary linearly or nonlinearly from 0.2 mm (0.008 in) or approximately 0.2 mm to 1.7 mm (0.07 in) or approximately 1.7 mm, or from 0 mm (0 in) or approximately 0 mm to 2.5 mm (0.1 in) or approximately 2.5 mm, or from 0.1 mm (0.004 in) or approximately 0.1 mm to 2.0 mm (0.08 in) or approximately 2.0 mm, along the length of the first type of cutting blade (in a radial outward direction), and a width W2 of the second type of cutting blade can vary linearly or nonlinearly from 1.2 mm (0.05 in) or approximately 1.2 mm to 1.7 mm (0.07 in) or approximately 1.7 mm, or from 0.5 mm (0.02 in) or approximately 0.5 mm to 2.5 mm (0.1 in) or approximately 2.5 mm, or from 1 mm (0.04 in) or approximately 1 mm to 2.0 mm (0.08 in) or approximately 2.0 mm, along the length of the second type of cutting blade (in a radial outward direction).

In other embodiments, the cutting portion 110 can have a first set of cutting blades, a second set of cutting blades, a third set of cutting blades, or even (optionally) a fourth set of cutting blades, wherein each set of cutting blades has a different size or shape (for example, a different length, height, and/or width). In other embodiments, all of the cutting blades can be approximately the same.

The depth limiting flange 120 can, in some embodiments, ensure that the depth that the cutting blades 116, 118 can penetrate into the tissue to be excised or removed is limited, providing greater accuracy and consistency to the process of removing defective tissue. In any embodiments, the depth limiting flange 120 can extend radially outward around some or all of the blades 116, 118. In some embodiments, the depth limiting flange 120 can be 0.9 mm (0.04 in) or approximately 0.9 mm wide, or from 0.5 mm (0.02 in) or approximately 0.5 to 1.5 mm (0.06 in) or approximately 1.5 mm or greater in width, or from 0.7 mm (0.03 in) or approximately 0.7 to 1.1 mm (0.04 in) or approximately 1.1 mm in width, or of any of the values or ranges of values within these ranges. The depth limiting flange 120 can have a generally planar surface. As such, in the illustrated embodiment, the outer diameter D2 of the plurality of cutting blades 116, 118 can be 12 mm (0.5 in) or approximately 12 mm (or from 10 mm (0.4 in), approximately 10 mm, or less than 10 mm to 14 mm (0.6 in), approximately 14 mm, or more than 14 mm, or from 11.5 mm (0.4 in) or approximately 11.5 mm to 12.5 mm (0.5 in) or approximately 12.5 mm), or, in other embodiments, can have any of the values, ranges of values, or values within the ranges of values listed in Table 1. In some embodiments, a thickness of the depth limiting flange 120 (represented by T1 in FIG. 2) can be 3.5 mm or approximately 3.5 mm (0.14 in), or from 2.5 mm (0.1 in) or approximately 2.5 mm to 4.5 mm (0.2 in) or approximately 4.5 mm, or any of the values or ranges of values within the foregoing ranges or as listed in Table 1.

In any embodiments of the reamer, including reamer 102, the cutting portion 110 can be configured such that an outer diameter of the plurality of blades 116, 118 (defined by D2) can be 87% or approximately 87% of an outer diameter of the cutting portion 110 (defined by D1), or from 70% or approximately 70% to 95% or approximately 95%, or from 80% or approximately 80% to 90% or approximately 90% of the outer diameter of the cutting portion 110, or of any value or from and to any values within these ranges. The outer diameter of the cutting portion 110 is defined for purposes of D1 by an outer perimeter or outer surface of the depth limiting flange 120.

In any embodiments of the reamer, including reamer 102, the blades 116, 118 of the cutting portion 110 can extend in an axial direction by a maximum height (represented by H1 shown in FIG. 2) past the depth limiting flange 120 of 2.8 mm (0.1 in) or approximately 2.8 mm, or from 1 mm (0.04 in), approximately 1 mm, or less than 1 mm to 8 mm (0.3 in), approximately 8 mm, or more than 8 mm, or from 2 mm (0.08 in) or approximately 2 mm to 4 mm (0.2 in) or approximately 4 mm, or from 2.5 mm (0.1 in) or approximately 2.5 mm to 3 mm (0.12 in) or approximately 3 mm, or of any value or from and to any values within these ranges. Note that, in some embodiments, one or more (or all) of the cutting blades (including, without limitation, cutting blades 116, 118) can have a changing profile along the length of the cutting blades. For example, one or more of the cutting blades (including, without limitation, cutting blades 116, 118) can have a height that increases along the length of the cutting blades such that an outermost portion of the cutting blades have a greater height than portions of the cutting blades that are radially inward from the outermost portion of the cutting blades. In some embodiments, the height of the cutting blades can increase linearly along at least a portion (or the entire) length of the cutting blades. In some embodiments, one or more of the cutting blades (or all of the cutting blades) can have a curved profile wherein a height of the cutting blades increases in a non-linear or curved fashion along the length of the cutting blades. In these configurations, the angulation of the cutting blades can facilitate tissue and debris removal from the reamer during operation of the reamer. In any embodiments, the height and shape of the blades can produce a convexly or concavely curved tissue surface at the bottom of the borehole of the tissue excised by the reamer.

As mentioned, a passageway 124 can extend axially through a center of the reamer 102. The passageway 124 can be configured to receive a guide element (which can be a guidewire) therein, as will be described in greater detail below. The passageway 124 of any embodiments of the reamer 102 can have a diameter (represented by D4 shown in FIG. 1) of 1.5 mm (0.1 in) or approximately 1.5 mm, or from 1 mm (0.04 in), approximately 1 mm, or less than 1 mm to 5 mm (0.2 in), approximately 5 mm, or more than 5 mm, or from 1 mm (0.04 in) or approximately 1 mm to 3 mm (0.12 in) or approximately 3 mm, or of any value or from and to any values within these ranges.

Embodiments of the articular cartilage restoration system disclosed herein can also include one or more punches. The punches can be used to size or trim the graft to the appropriate size, based on the reamer 102 that was selected. Any suitable punches known in the industry or which can be developed by one of ordinary skill in the industry can be used in any of the articular cartilage restoration system embodiments or methods disclosed herein.

Some embodiments of the articular cartilage restoration system can comprise a plurality of reamers 102 and a plurality of punches. For example and without limitation, some embodiments of the articular cartilage restoration system can include from 2 to 10 or more, or from 4 to 8, or optionally 5 reamers. The reamers 102 can each has a different size diameter, length, blade configuration, blade length, or other details. Additionally, some embodiments of the articular cartilage restoration system can comprise from 2 to 10, or from 4 to 8, or optionally 5 punches. The punches can each has a different size diameter, length, or other details. Additionally, each of the punches can be sized and configured to work with each of the reamers 102 in the system so as to provide a precisely fitting allograft based on the size of the excised recess or hole. Any embodiments of the articular cartilage restoration system can also have a drill and a punch block.

Figure 17:
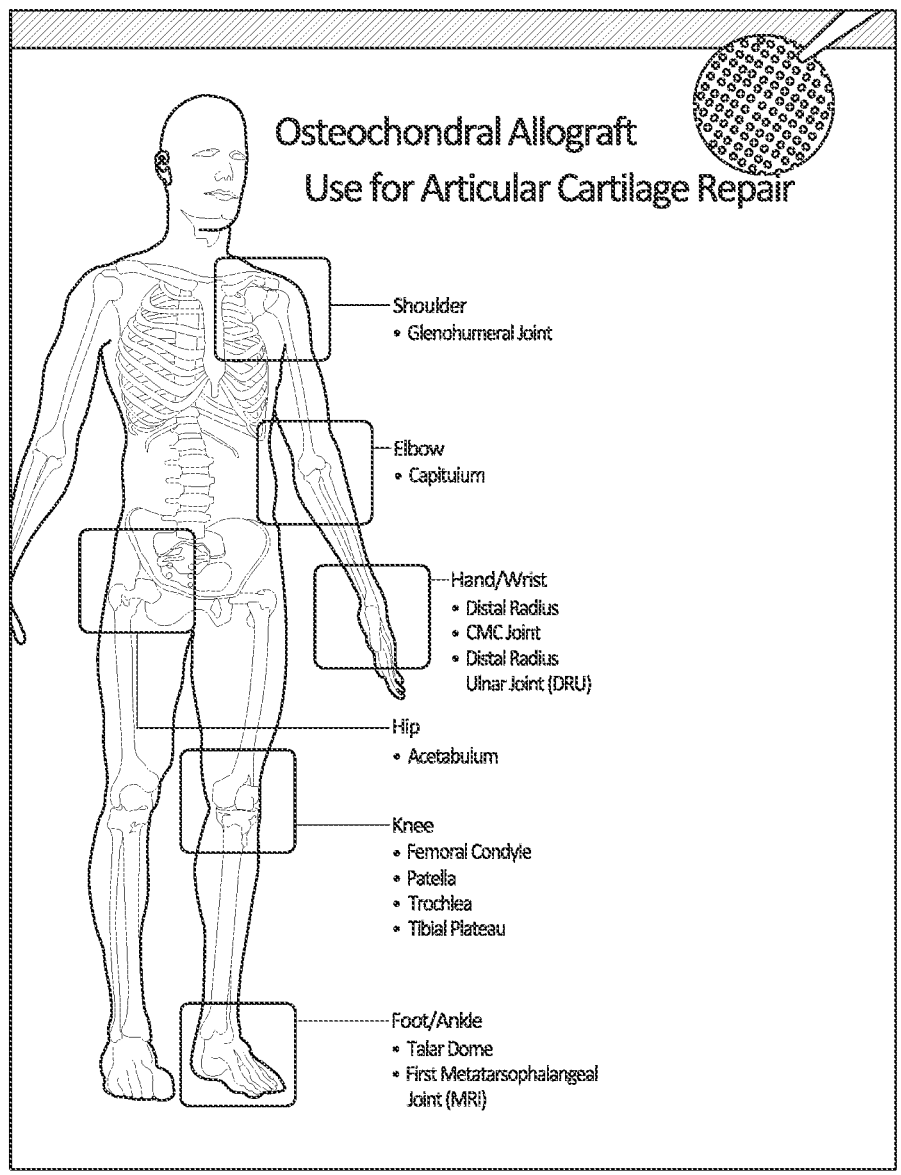
FIG. 17 shows examples of locations that may be suitable for any of the devices and/or methods disclosed herein.
Figure 20:
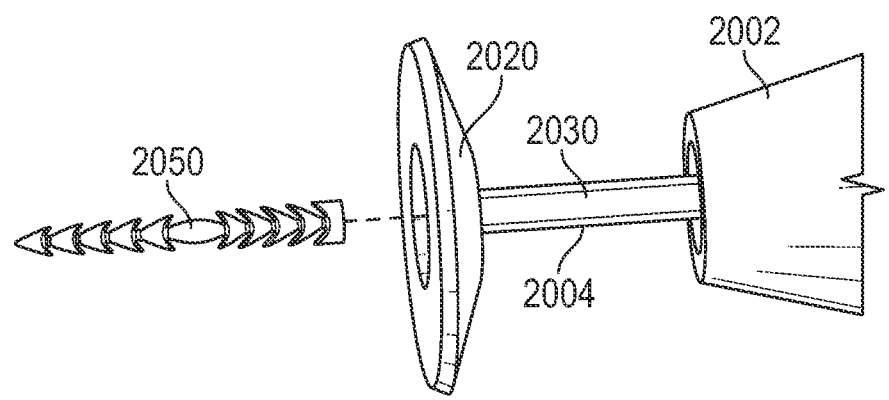
FIG. 20 is a side view of a portion of the embodiment of the instrument shown in FIG. 18.

Any reamer or articular cartilage restoration system embodiments disclosed herein can be used in any of the methods as described below. Note that embodiments of the methods or steps disclosed below can be modified to include any combination of the steps or procedures described below, with any of the steps or procedures being eliminated and/or new steps being added, to form new embodiments of the methods of use of any of the reamer and articular cartilage restoration system embodiments disclosed herein. Additionally, any of the embodiments of the methods or steps disclosed below can be modified for use to restore cartilage (which can be articular cartilage) on other joints or areas of the body, including without limitation cartilage or other tissue in a tibia, phalanx bones, shoulder, the elbow, the hand, the wrist, the hip, the knee, the foot, the ankle, or other suitable joints or cartilage, or other locations shown in FIG. 17.

Figure 12:
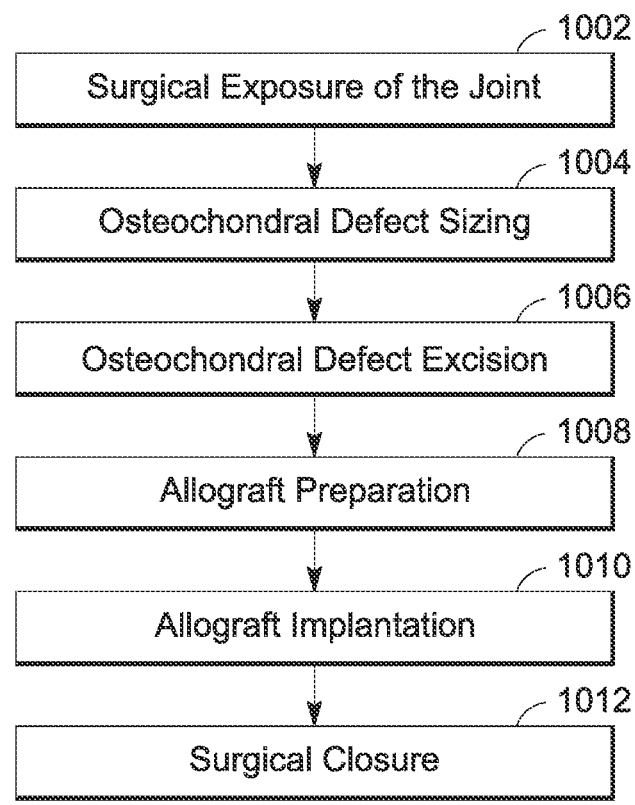
FIG. 12 illustrates a flow chart of an exemplifying surgical procedure.
Figure 13:
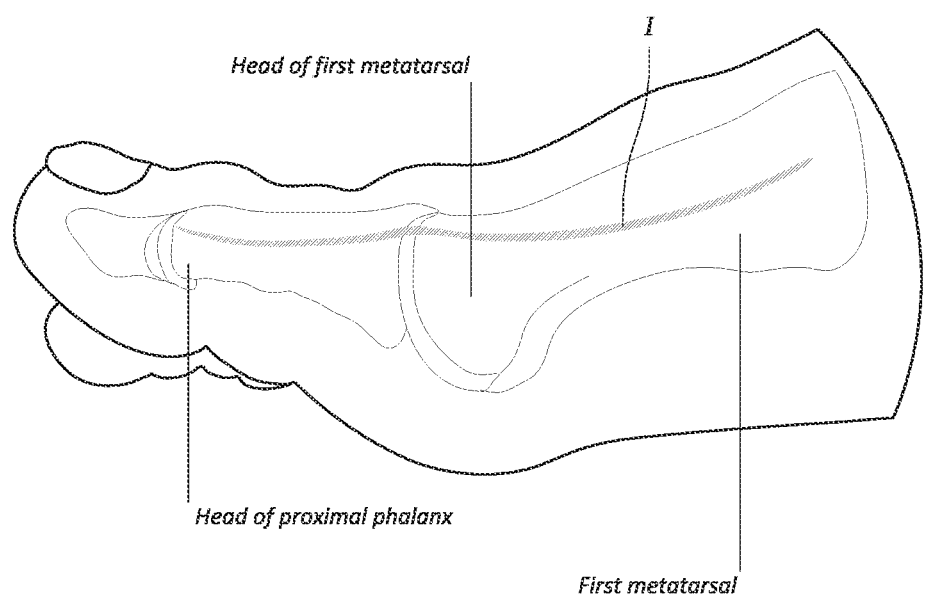
FIG. 13 illustrates an exemplifying location that a surgical incision can be made in a metatarsophalangeal joint.

A non-limiting example of a method or process 1000 for restoring cartilage in a metatarsophalangeal joint is described below and shown in FIG. 12. To achieve surgical exposure of the joint 1002, the patient should be placed into the supine position. The process 1000 can begin, generally, with surgical exposure of the joint J, including any preparatory work that is needed. For the step, a standard dorsal incision I of the metatarsophalangeal joint can be created, as illustrated in FIG. 13. Optionally, complete exposure of the metatarsophalangeal joint J can be performed. Manual distraction may be utilized to maintain access to the osteochondral defect throughout the procedure.

Figure 14:
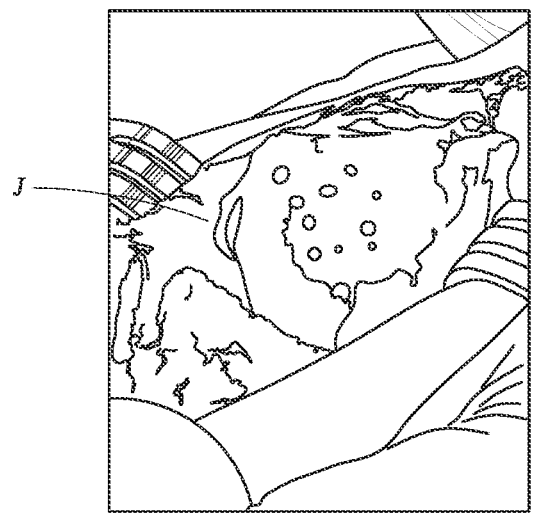
FIG. 14 shows an osteochondral defect.

Subsequently, with reference to FIG. 14, the surgeon or surgical team can perform osteochondral defect sizing 1004, as described hereinafter. After obtaining exposure to the joint J, the cartilage defect can be identified. The various size reamers 102 from the system or kit can then be placed over the defect site to establish proper graft sizing. This can be done by using the appropriate sized reamer 102 from the system or kit to completely cover the defect. While holding the reamer 102 over the defect, a guide wire G can then be placed through the cannulated opening in the reamer. The guidewire can remain in position while the reamer 102 is coupled with a power drill. Any embodiments of the reamer 102 can optionally be connectable to the drill or other tool using a standard American Orthopedic (AO) connection.

Figure 15:
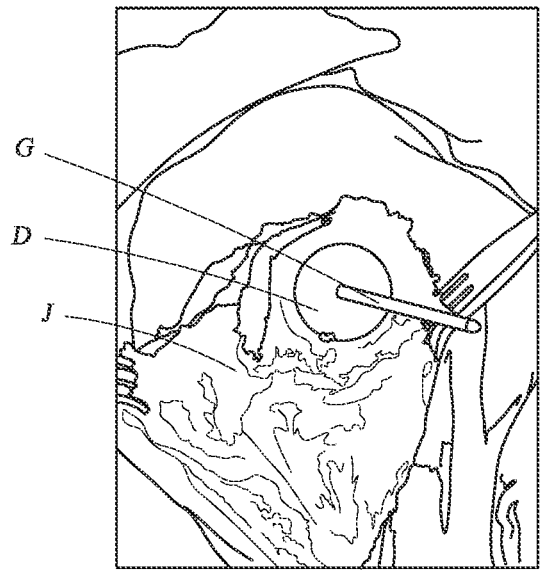
FIG. 15 shows a surgical site after the pathology has been excised.

Subsequently, the surgeon or surgical team can perform osteochondral defect excision 1006, as described hereinafter. The reamer 102 can be advanced over the guide wire G. The drill can be activated, and a precise circular defect can be created by advancing the rotating reamer 102 into the pathology to excise the pathology. FIG. 15 shows a surgical site after the pathology has been excised. As discussed above, the embodiments of the reamer 102 disclosed herein are configured to have a depth stop or depth limiting flange built into the reamers 102 that will ensure a consistent and precise defect excision depth. For example and without limitation, some embodiments of the reamer 102 disclosed herein can have the depth limiting flange 120 described above or another feature configured to provide a positive stop or limit to the depth that the reamer can cut. The defect excision depth achieved by the reamer 102 can be designed to accommodate the thickest allograft suitable for such joint or condition.

Subsequently, the surgeon or surgical team can perform allograft preparation 1008, as described hereinafter. The appropriate allograft G can be thawed and placed on the punch block. The corresponding punch can be placed over the graft and a mallet or other suitable tool or instrument can be used to trim the allograft G to the appropriate diameter.

Figure 16:
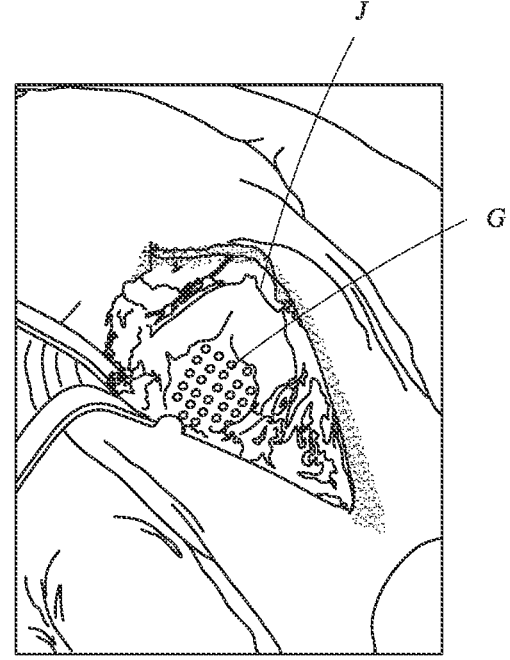
FIG. 16 shows a surgical site after an allograft has been implanted.

The surgeon or surgical team can then perform allograft G implantation 1010, as described hereinafter. The allograft (also referred to herein as a graft) G can then be placed over the defect D created in the joint J oriented appropriately and secured with the surgeons preferred method which can include suture, fibrin glue and/or absorbable anchors, pins, or using any other suitable technique or method, as shown in FIG. 16.

Thereafter, the surgeon or surgical team can perform surgical closure 1012 of the wound, as described hereinafter. The wound closure can be performed using the surgeon's preferred method.

Any embodiments of the reamer and other components disclosed herein can be configured to be used endoscopically. For example and without limitation, the reamer can be configured to be advanced to the tissue site through an endoscope and subsequent steps can be performed endoscopically.

In any embodiments disclosed herein, the reamer can have dimensions of any of the features, or any subset of the features, that are 5% or approximately 5% greater than or 5% or approximately 5% less than the dimensions disclosed for any embodiments disclosed herein, or that are 10% or approximately 10% greater than or 10% or approximately 10% less than the dimensions disclosed for any embodiments disclosed herein, or that are 15% or approximately 15% greater than or 15% or approximately 15% less than the dimensions disclosed for any embodiments disclosed herein, or that are 20% or approximately 20% greater than or 20% or approximately 20% less than the dimensions disclosed for any embodiments disclosed herein, or that are 30% or approximately 30% greater than or 30% or approximately 30% less than the dimensions disclosed for any embodiments disclosed herein, or larger or smaller than in other embodiments disclosed herein in proportion to a difference in the diameter (D1 or D2) of the reamers. One exception to this, in some embodiments, relates to the height H1 of the cutting blades, which can remain approximately constant regardless of the diameter of the reamer, or can change by a small percentage from a first diameter of the reamer to a second diameter of the reamer that is larger than or smaller than the first diameter. In some embodiments, the height H1 of the cutting blades can be selected based on the thickness of the graft to be positioned in the excised bore hole, regardless of the diameter of the reamer.

FIG. 18 is a side view of an embodiment of an instrument 2000 for implanting a graft in a cutout created by any reamer embodiments disclosed herein. The instrument can have a handle or body portion 2002 and a cannula 2004 extending distally from a distal end of the handle 2002. A drill element 2005 having a drilling tip 2006 and a handle portion 2008 coupled with the drilling tip 2006 can be advanced axially through an opening extending through the handle portion 2002 and the cannula 2004. The drilling tip 2006 can be used to create a borehole in a center or approximate center of the cutout and can be sized and configured to receive an anchor element, as will be described. In some embodiments, the allograft can be positioned against the cover 2020 before drilling so that the drill can pass through the allograft as the drill tip 2006 is being used to create the bore hole in the patients tissue. A depth limiting element 2010 can be coupled with the handle portion 2008 of the drill to limit a depth that the drilling tip 2006 can advance to in the patient's tissue and/or bone. In some embodiments, the depth can be adjusted by adjusting a position of the depth limiting element 2010 relative to the handle portion 2002, the distal end of the drilling tip 2006, or other features configured to engage with and/or limit a distal movement of the depth limiting element 2010.

After a bore hole is created with the drill element 2005, the drill element 2005 can be removed from the instrument 2000 and an allograft can be cut to the size of the cutout, if needed, and can be positioned in the cutout. The allograft can, in some embodiments, be positioned in the cutout by placing the allograft in contact with a distal surface 2044 of a cover 2020 that can be selectively coupled with a distal end of the cannula 2004. Thereafter, the allograft could be positioned in the cutout using the instrument 2000, with the cover 2020 positioned over the allograft. Thereafter, an anchor element 2050 can be advanced through the instrument 2000, including through the handle portion 2002, the cannula 2004, and the allograft and into the bore hole created by the drill element 2005 to secure the allograft to the cutout and the patient's tissue. A pusher 2030 can be used to advance the anchor element 2050 through at least the handle portion 2002 and the cannula 2004. Thereafter, the anchor element 2050 can be trimmed, as needed. In any embodiments, the instrument 2000 can be advanced toward the cutout by advancing the instrument 2000 over a guidewire.

Figure 21A:
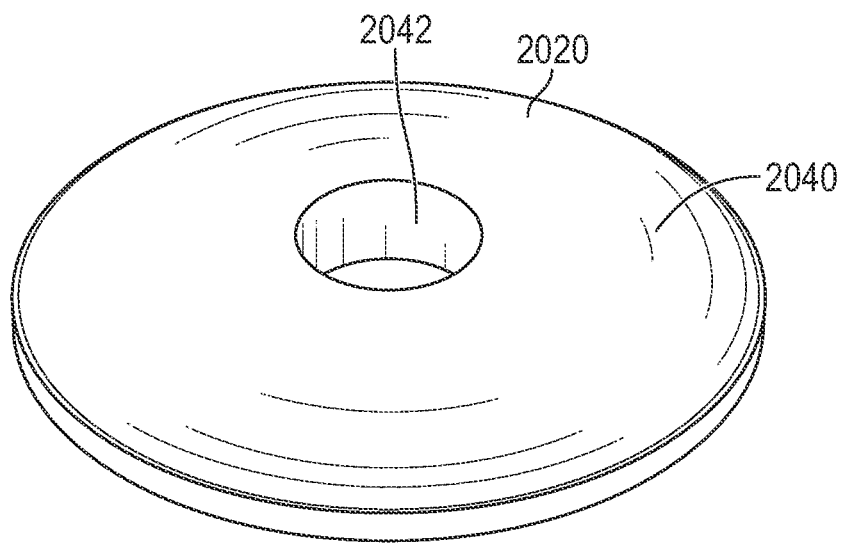
FIG. 21A is a perspective view of an embodiment of a retaining element that can be used with any of the embodiments of the instrument for implanting a graft in a cutout disclosed herein.
Figure 21B:
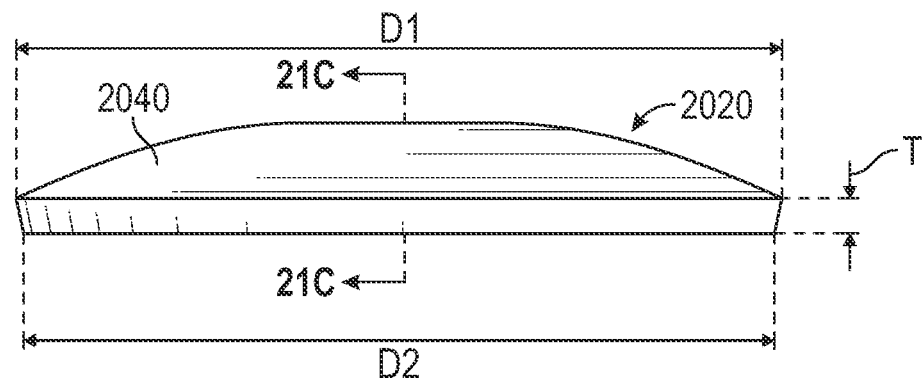
FIG. 21B is a side view of the embodiment of the retaining element shown in FIG. 21A.
Figure 21C:
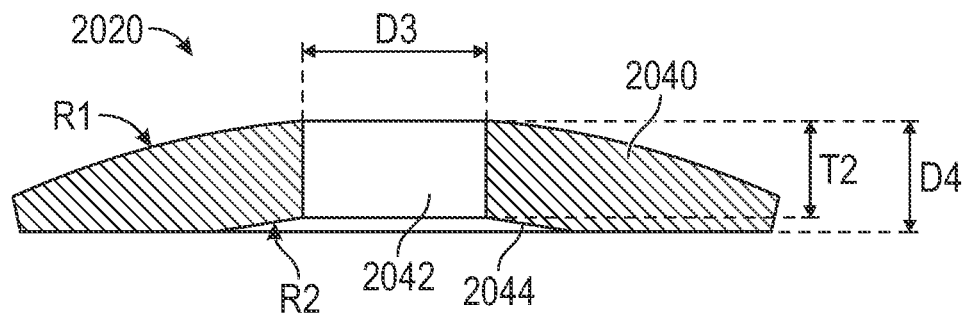
FIG. 21C is a section view of the embodiment of the retaining element shown in FIG. 21A.

With reference to FIGS. 21A-21B, the cover 2020 can have a curved proximal surface 2040, an opening 2042 extending through the cover 2020 along an axial centerline of the cover 2020, and a curved distal surface 2044. In some embodiments, the curved distal surface 2044 can be configured to match or approximately match a curvature of the bottom surface of the cutout and/or the curvature of the cutting blades of the reamer. In some embodiments, the cover can have a diameter D1 that is greater than a diameter D2 of the reamer by, for example and without limitation, 20% or more. In some embodiments, the diameter D1 of the cover can be 10.3 mm (0.41 in), or approximately 10.3 mm. In some embodiments, the cover can have a second diameter D2 at a distal end thereof of 10 mm (0.4 in), or approximately 10 mm, a thickness T at an outside edge of 0.49 mm (0.02 in) or approximately 0.49 mm, and a thickness T2 at the opening of 1.31 mm (0.05 in) or approximately 1.31 mm. In some embodiments, the opening 2042 can have a diameter of from 2.5 mm (0.1 in) or approximately 2.5 mm to 2.6 mm (0.1 in) or approximately 2.6 mm. The proximal surface 2040 of the cover can, in some embodiments, have a radius of 12.8 mm (0.5 in) or approximately 12.8 mm. The distal surface 2044 of the cover can, in some embodiments, have a radius of 11.5 mm (0.5 in) or approximately 11.5 mm.

Figure 22:
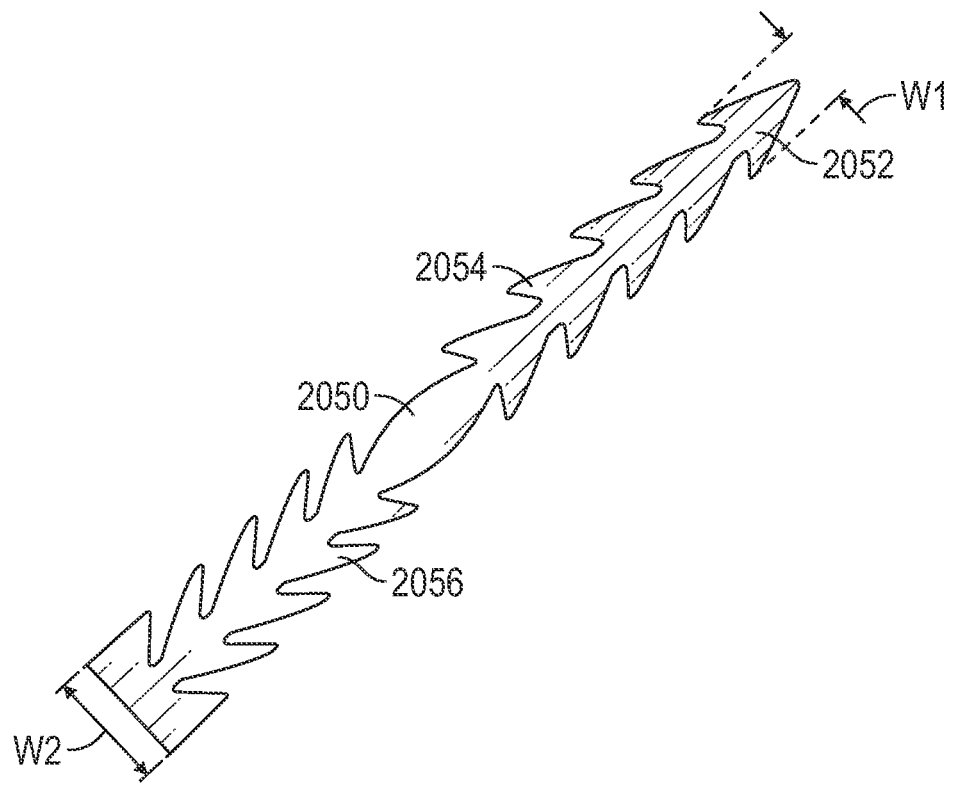
FIG. 22 is a side view of an embodiment of an anchor element that can be used to anchor a graft in a cutout created by a reamer.

With reference to FIG. 22, in some embodiments, the anchor element can have a distal tip 2052 that is pointed but can be rounded, and can have a first plurality of barbs 2054 angled away from the distal tip 2052 and a second set of barbs 2056 angled toward the distal tip 2052. The first set of barbs 2054 can be configured to secure the anchor element 2050 into the tissue of the patient in the bore hole created by the drilling element 2005. The second set of barbs 2054 can be configured to secure the anchor element 2050 to the allograft so that the allograft is secured in the cutout created by the reamer. In some embodiments, the anchor element 2050 can have a tapering width wherein a first width W1 at a distal end of the anchor element 2050 is less than a second width W2 at a proximal end of the anchor element 2050, for example and without limitation, by 10% or more, or 20% or more, or from 10% to 20%.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A reamer device for removing tissue from a patient, comprising:
   a shaft;
   a cutting head coupled with the shaft, the cutting head having at least four cutting blades; and
   a depth limiting element having a distal surface configured to contact a surface of the patient's tissue to limit a depth into the patient's tissue that the at least four cutting blades can advance to;
   wherein:
     the depth limiting element extends radially outwardly of the at least four cutting blades so that the depth limiting element is configured to contact a surface of the patient's tissue adjacent to a cutout created by the at least four cutting blades;
     the cutting head comprises a first type of cutting blade and a second type of cutting blade, wherein the first type of cutting blade is different than a second type of cutting blade; and
     at least one of the cutting blades has a cutting surface that is concavely curved along a length of the at least one of the cutting blades.

2. The reamer device of claim 1, wherein the depth limiting element comprises a surface that is generally planar and generally perpendicular to a longitudinally extending axial centerline axis of the reamer device.

3. The reamer device of claim 1, wherein the cutting head comprises a first type of cutting blade and a second type of cutting blade, wherein the first type of cutting blade is different than the second type of cutting blade.

4. The reamer device of claim 1, wherein the at least four cutting blades comprises a first type of cutting blade and a second type of cutting blade, wherein:
the first type of cutting blade has a first length, a first height, and a first width;
the second type of cutting blade has a second length, a second height, and a second width; and
the first length is different than the second length, the first height is different than the second height, and/or the first width is different than the second width.

5. The reamer device of claim 4, comprising four of the first type of cutting blade and four of the second type of cutting blade, wherein each of the four of the second type of cutting blade are positioned between each of the four of the first type of cutting blade.

6. The reamer device of claim 5, wherein:
each of the four second type of cutting blade are positioned between each of the four first type of cutting blade; and
the first length of the first type of cutting blade is longer than the second length of the second type of cutting blade.

7. The reamer device of claim 1, further comprising a plurality of openings extending through the cutting head in an axial direction, the plurality of openings being configured to permit a passage of removed tissue to pass through said openings during use of the reamer and being positioned between each of the cutting blades.

8. The reamer device of claim 1, wherein the cutting head has eight cutting blades and eight openings extending through the cutting head in an axial direction, the openings being configured to permit removed tissue to pass through said openings during use of the reamer.

9. The reamer device of claim 1, wherein the cutting blades each has an angled profile such that a height of the cutting blades increases along a length of the cutting blades such that the outermost portion of the cutting blades have a larger height than portions of the cutting blades that are radially inward from the outermost portion of the cutting blades.

10. The reamer device of claim 1, wherein each of the at least four cutting blades has a curved cutting surface configured to create a curved surface at a bottom of the cutout.

11. The reamer device of claim 1, wherein the depth limiting element comprises an annular flange positioned radially outward of the at least four cutting blades.

12. A system for removing tissue from a patient, comprising the reamer device of claim 1 and a guide element, wherein the reamer device is configured to be advanced over the guide element.

13. The system for removing tissue from a patient of claim 12, further comprising one or more punches configured to size an allograft to approximately match a size of the cutout formed in a patient by the reamer device.

14. The system for removing tissue from a patient of claim 12, further comprising an allograft, an anchor element, and a delivery device.

15. The reamer device of claim 1, wherein:
the depth limiting element circumscribes the at least four cutting blades and has a generally planar surface;
an outer diameter of the plurality of cutting blades is at least 10% less than an outer diameter of the depth limiting element;
the plurality of cutting blades extend axially away from the planar surface; and
each of the at least four cutting blades extends to a height past the depth limiting element that increases along a length of the cutting blade such that an outermost portion of the cutting blade extends to a larger height past the depth limiting element than portions of the cutting blade that are radially inward from the outermost portion of the cutting blade.

16. The reamer device of claim 15, further comprising a plurality of openings extending through the cutting head in an axial direction, the plurality of openings being configured to permit cut tissue to pass through said openings during use of the reamer.

17. The reamer device of claim 15, wherein the cutting head comprises a first type of cutting blade and a second type of cutting blade, wherein the first type of cutting blade is different than the second type of cutting blade.

18. The reamer device of claim 15, wherein the at least four cutting blades comprises a first type of cutting blade and a second type of cutting blade, wherein:
the first type of cutting blade has a first length, a first height, and a first width;
the second type of cutting blade has a second length, a second height, and a second width; and
the first length is different than the second length, the first height is different than the second height, and/or the first width is different than the second width.

19. A method of treating a tissue of a patient, comprising:
advancing the reamer device of claim 1 toward a surface of a patient's tissue; and
creating the cutout with the at least four cutting blades of the reamer device to excise tissue from the patient;
wherein:
creating the cutout with the reamer device comprises advancing the reamer device into the patient's tissue until the depth limiting element of the reamer device prevents the at least four blades of the reamer device from advancing to a greater depth into the patient's tissue and rotating the at least four blades of the reamer device to form the cutout.

20. The method of claim 19, wherein the cutout has a convexly curved tissue surface.

* * * * *